United States Patent
Braun et al.

(10) Patent No.: US 9,925,546 B2
(45) Date of Patent: Mar. 27, 2018

(54) SPRAY NOZZLE AND METHOD FOR PRODUCING NON-ROUND SPRAY CONES

(71) Applicants: Patrick Braun, Roemerstein (DE); Petra Huettner, Reutlingen (DE); Juergen Speier, Reutlingen (DE)

(72) Inventors: Patrick Braun, Roemerstein (DE); Petra Huettner, Reutlingen (DE); Juergen Speier, Reutlingen (DE)

(73) Assignee: LECHLER GMBH, Metzingen (DE)

( * ) Notice: Subject to any disclaimer, the term of this patent is extended or adjusted under 35 U.S.C. 154(b) by 24 days.

(21) Appl. No.: 15/139,912

(22) Filed: Apr. 27, 2016

(65) Prior Publication Data

US 2016/0318047 A1 Nov. 3, 2016

(30) Foreign Application Priority Data

Apr. 28, 2015 (DE) .................. 10 2015 207 741

(51) Int. Cl.
B05B 1/02 (2006.01)
B05B 1/06 (2006.01)
(Continued)

(52) U.S. Cl.
CPC ............ B05B 1/3468 (2013.01); B05B 1/02 (2013.01); B05B 1/14 (2013.01); B05B 1/3426 (2013.01);
(Continued)

(58) Field of Classification Search
CPC .... B05B 1/02; B05B 1/06; B05B 1/14; B05B 1/3405; B05B 1/341; B05B 1/3415;
(Continued)

(56) References Cited

U.S. PATENT DOCUMENTS 545,320 A * 8/1895 VanSickle ............. B05B 1/3426
239/468
1,961,408 A * 6/1934 Wahlin .................. B05B 1/3426
239/468
(Continued)

FOREIGN PATENT DOCUMENTS

AT           21 837 B      11/1984
CN        201172011 Y      12/2008
(Continued)

OTHER PUBLICATIONS

Office Action of German Patent Office issued in Application No. 10 2015 207 741.1 dated Jul. 14, 2015 (6 pages).
(Continued)

*Primary Examiner* — Darren W Gorman
(74) *Attorney, Agent, or Firm* — Flynn, Thiel, Boutell & Tanis, P.C.

(57) ABSTRACT

A spray nozzle having a nozzle housing, at least one swirl chamber which is disposed in the nozzle housing, and at least one exit opening, wherein the exit opening is disposed at the end of an exit duct which emanates from the swirl chamber and widens in the direction towards the exit opening, wherein a constriction is disposed at the transition from the swirl chamber to the exit duct, and wherein the angle of the wall steadily increases in the direction towards the exit opening or in portions remains identical, in which an angle of the wall of the exit duct at the exit opening, when viewed in the circumferential direction of the exit opening, is not constant.

20 Claims, 10 Drawing Sheets

(51) Int. Cl.
*B05B 1/14* (2006.01)
*B05B 1/34* (2006.01)
*B01D 47/06* (2006.01)
*B01D 53/18* (2006.01)

(52) U.S. Cl.
CPC .............. *B01D 47/06* (2013.01); *B01D 53/18* (2013.01); *B05B 1/06* (2013.01)

(58) Field of Classification Search
CPC ... B05B 1/3421; B05B 1/3426; B05B 1/3436; B05B 1/3468; B01D 47/06; B01D 47/063; B01D 53/18; B01D 53/185
See application file for complete search history.

(56) References Cited

U.S. PATENT DOCUMENTS

| | | | | |
|---|---|---|---|---|
| 2,484,577 A | * | 10/1949 | Murphy | B05B 1/14 239/468 |
| 3,326,473 A | * | 6/1967 | Wahlin | B05B 1/3421 239/468 |
| 3,771,728 A | * | 11/1973 | Polnauer | F23D 11/383 239/468 |
| 3,923,253 A | * | 12/1975 | Stewart | B05B 1/3426 239/463 |
| 3,948,444 A | * | 4/1976 | Reed | B05B 1/3405 239/11 |
| 4,223,841 A | | 9/1980 | Schaller et al. | |
| 4,584,147 A | * | 4/1986 | Stehning | B05B 1/3426 239/469 |
| 4,664,314 A | * | 5/1987 | O'Brien | B05B 1/06 239/469 |
| 5,622,489 A | | 4/1997 | Monro | |
| 6,322,617 B1 | | 11/2001 | Wurz et al. | |
| 6,402,062 B1 | * | 6/2002 | Bendig | B05B 1/042 239/589 |
| 6,578,778 B2 | * | 6/2003 | Koizumi | F02M 51/0678 239/463 |
| 6,772,960 B2 | | 8/2004 | Speier | |
| 7,175,109 B2 | | 2/2007 | Schroeder et al. | |
| 2001/0010341 A1 | | 8/2001 | Koizumi et al. | |
| 2002/0020757 A1 | | 2/2002 | Speier | |
| 2005/0017093 A1 | | 1/2005 | Schroeder et al. | |
| 2005/0139157 A1 | | 6/2005 | Nissinen et al. | |
| 2008/0179428 A1 | * | 7/2008 | Songbe | B05B 1/3436 239/491 |

FOREIGN PATENT DOCUMENTS

| | | |
|---|---|---|
| DE | 40 15 412 C1 | 6/1991 |
| DE | 197 58 526 A1 | 6/1999 |
| DE | 100 33 781 C1 | 12/2001 |
| DE | 10 2007 024 221 A1 | 11/2008 |
| EP | 0 126 688 A1 | 11/1984 |
| EP | 1 491 260 B1 | 12/2004 |
| FR | 2 372 057 | 6/1978 |
| JP | 6-29646 U | 4/1994 |
| JP | 07-088531 | 4/1995 |
| JP | 07-163915 A | 6/1995 |
| JP | 09-094486 A | 4/1997 |
| JP | 2000-334335 A | 12/2000 |
| JP | 2005-7394 A | 1/2005 |
| JP | 2005-515056 A | 5/2005 |
| WO | WO 2013/028165 A2 | 2/2013 |

OTHER PUBLICATIONS

Search Report of European Patent Office issued in Application No. 16166257 with English translation of category of cited documents dated Sep. 22, 2016 (7 pages).

Office Action of Japan Patent Office issued in Application No. 2016-197885 with English translation, dated Dec. 5, 2017 (11 pages).

* cited by examiner

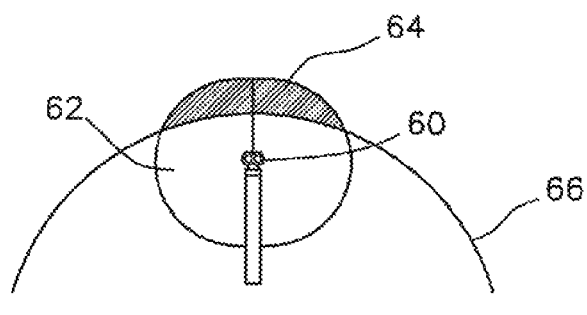
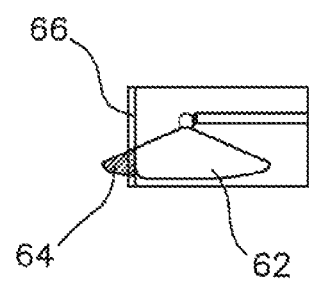
Fig. 6
(Prior Art)
Fig. 7
(Prior Art)
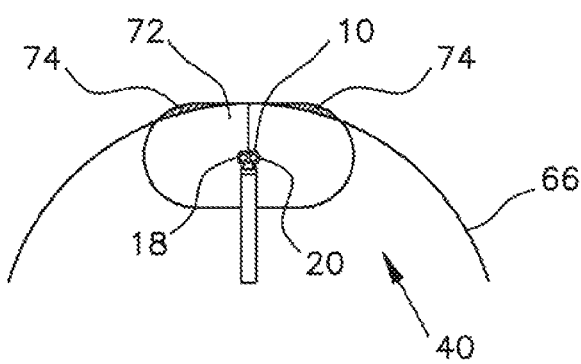
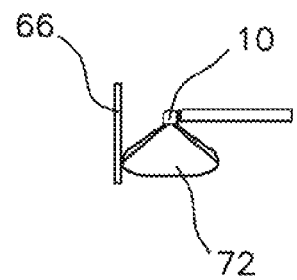
Fig. 8
Fig. 9

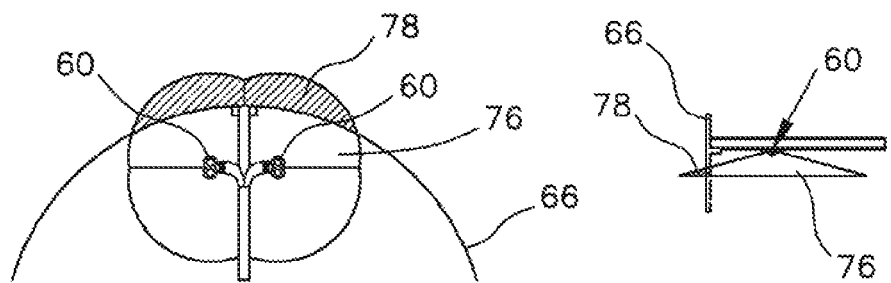
Fig. 10
(Prior Art)
Fig. 11
(Prior Art)
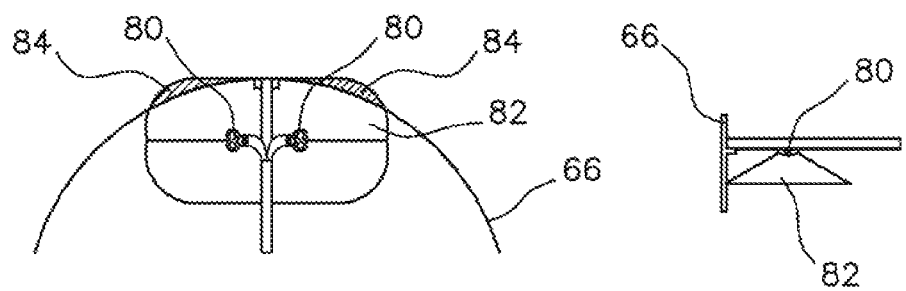
Fig. 12
Fig. 13
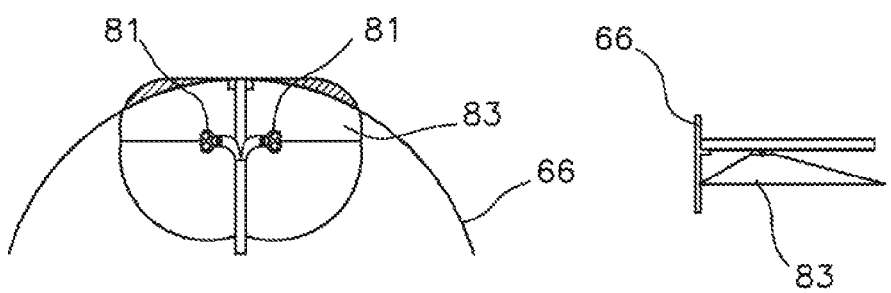
Fig. 14
Fig. 15

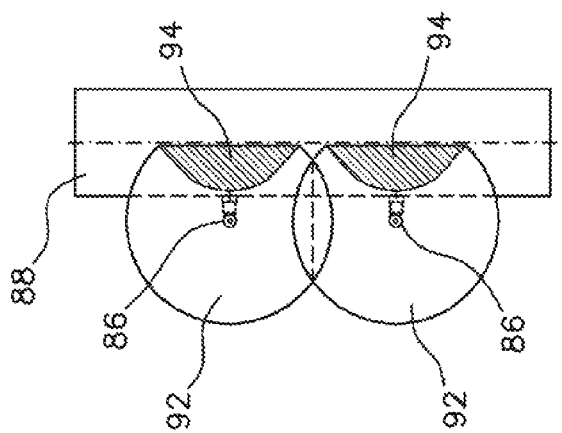
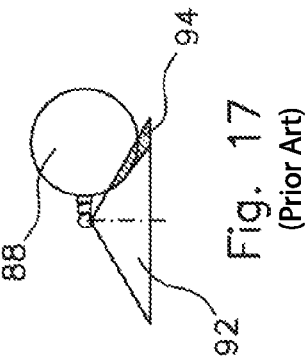
Fig. 20
Fig. 21
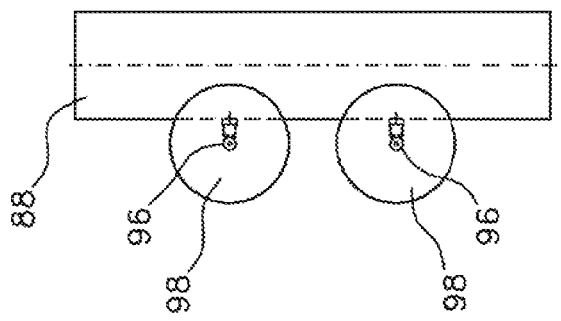
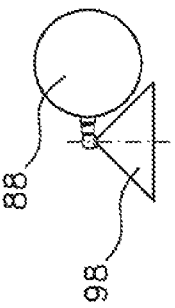
Fig. 18
(Prior Art)
Fig. 19
(Prior Art)
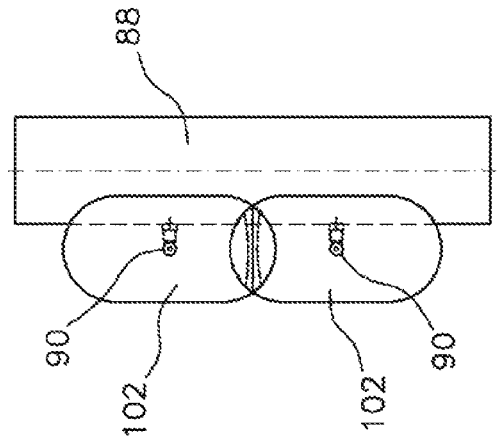
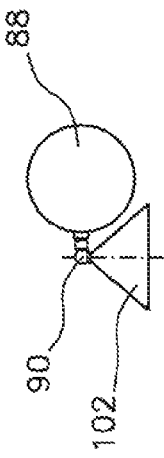
Fig. 16
(Prior Art)
Fig. 17
(Prior Art)

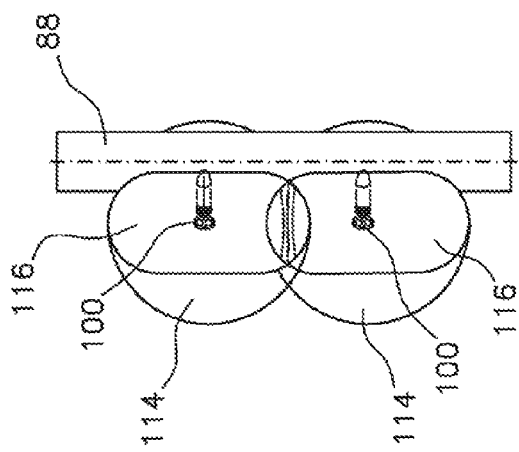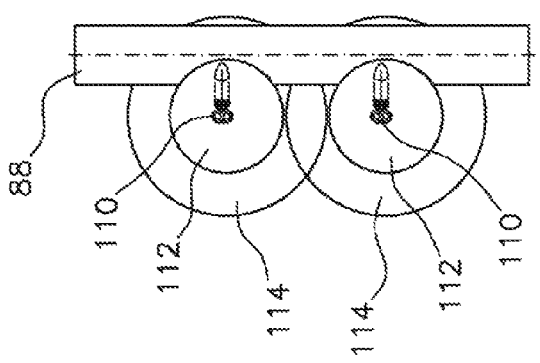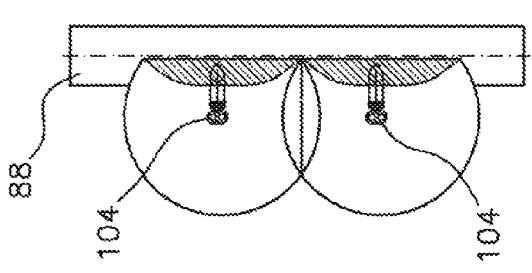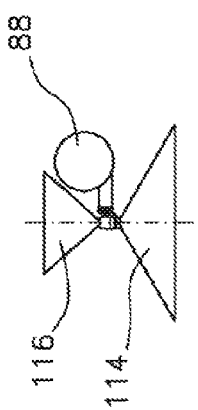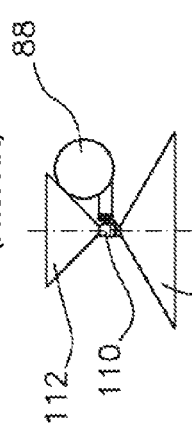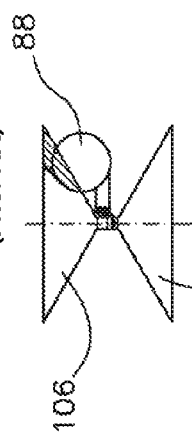
Fig. 28
Fig. 29
Fig. 26 (Prior Art)
Fig. 27 (Prior Art)
Fig. 24 (Prior Art)
Fig. 25 (Prior Art)

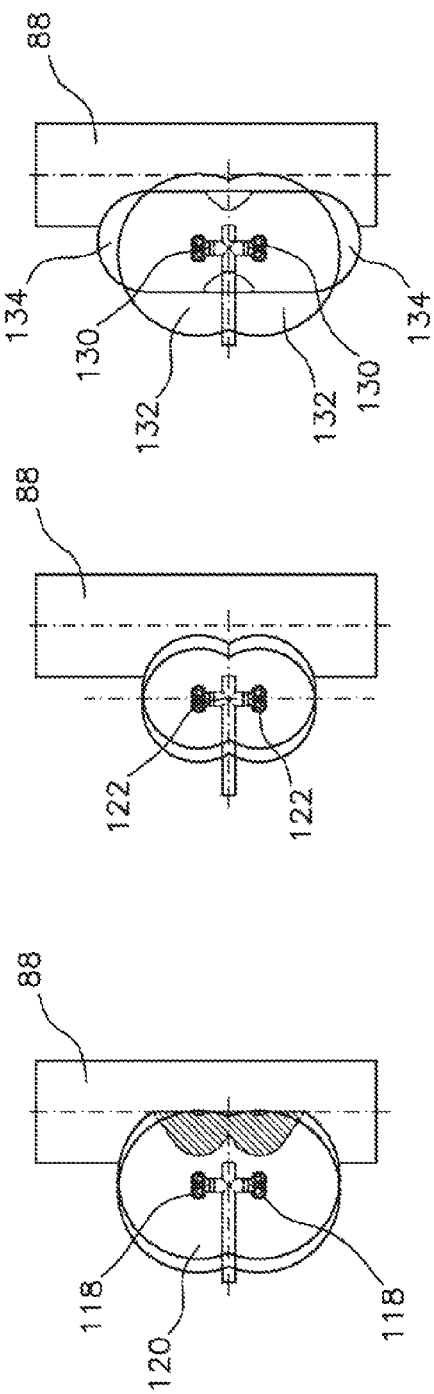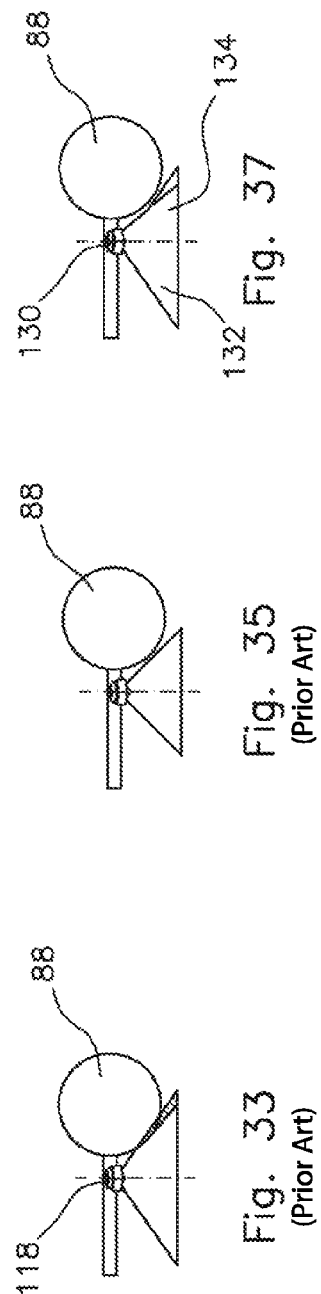

SPRAY NOZZLE AND METHOD FOR PRODUCING NON-ROUND SPRAY CONES

CROSS-REFERENCE TO RELATED APPLICATIONS

This claims priority from German Patent Application No. 10 2015 207 741.1, filed on Apr. 28, 2015, the disclosure of which is hereby incorporated by reference in its entirety into this application.

FIELD OF THE INVENTION

The invention relates to a spray nozzle having a nozzle housing, at least one swirl chamber which is disposed in the nozzle housing, and at least one exit opening, wherein the exit opening is disposed at the end of an exit duct which emanates from the swirl chamber and widens in the direction towards the exit opening, wherein a constriction is provided at the transition from the swirl chamber to the exit duct, and the angle of the wall of the exit duct, starting from the constriction, steadily increases in the direction towards the exit opening or in portions remains identical. The invention also relates to a method for producing a spray cone having a cross section which is non-round, that is to say deviates from the circular shape.

BACKGROUND OF THE INVENTION

A double-swirl spray nozzle which has two swirl chambers, one exit duct which widens in the direction towards an exit opening emanating from each of said swirl chambers, is disclosed in European Patent Document EP 1 491 260 B1. An angle of the wall of the exit duct in relation to a longitudinal central axis of the exit duct steadily increases in a few portions in the direction towards the exit opening while said angle remains identical in other portions. The double-swirl spray nozzle shown has both exit openings on the same side of the nozzle housing. The two exit openings are disposed at an angle in relation to one another. The double-swirl spray nozzle described is employed in flue gas purification plants, for example, in particular in gas scrubbers.

German Patent Document DE 100 33 781 C1 describes a double-swirl spray nozzle which has two swirl chambers and exit ducts which in each case emanate from the swirl chambers and run up to an exit opening. The exit openings are oriented towards opposite sides of the housing.

SUMMARY OF THE INVENTION

By way of the invention a spray nozzle is intended to be improved in terms of the flexibility of the application thereof.

According to the invention, to this end a spray nozzle having a nozzle housing, at least one swirl chamber which is disposed in the nozzle housing, and at least one exit opening is provided, wherein the exit opening is disposed at the end of an exit duct which emanates from the swirl chamber and widens in the direction towards the exit opening, wherein a constriction is disposed at the transition from the swirl chamber to the exit duct, and wherein the angle of the wall of the exit duct, starting from the constriction, steadily increases in the direction towards the exit opening or in portions remains identical, in which a shape of the exit opening deviates from a circular shape, and in which an angle of the wall of the exit duct at the exit opening, when viewed in the circumferential direction of the exit opening, is not constant.

By virtue of a shape of the exit opening deviating from a circular shape and an angle of the wall of the exit duct at the exit opening, when viewed in the circumferential direction of the exit opening, not being constant, a cross-sectional shape of the delivered spray cone may deviate from a circular shape. This is especially advantageous when the spatial conditions make a non-circular spray cone appear to be ideal in order for as good a coverage as possible to be achieved with the spray cone. This may be the case in particular in gas scrubbers, for example, when spray nozzles are disposed in the region of the wall of a gas scrubber having a circular-cylindrical shape. Here, liquid which is being sprayed into the gas scrubber by the spray nozzle should typically be prevented from impacting directly on the wall of the gas scrubber. By way of the nozzle according to the invention a cross-sectional shape of the spray cone that deviates from the circular shape may be set such that the spray cone delivered by the spray nozzle is propagated into the interior space of the gas scrubber and not in the direction towards the wall. A constriction between the swirl chamber and the exit duct may be formed by an encircling edge and/or by an initial portion of the exit duct, wherein the wall of the exit duct in this initial portion runs substantially parallel with a longitudinal central axis of the exit duct. The invention may be applied in any type of nozzle having a swirl chamber, for example in tangential nozzles, axial nozzles, and also in spill-back nozzles. An incident flow to the swirl chamber in the case of axial nozzles and spill-back nozzles is typically performed in an axial manner such that a swirl insert is optionally provided.

In a refinement of the invention the exit duct at the transition from the swirl chamber to the exit duct has a circular cross section.

Such a circular cross section of the exit duct at the transition from the swirl chamber to the exit duct is advantageous for good distribution of the liquid to be sprayed in the delivered spray cone. A hollow-cone spray is delivered, for example. The circular cross section of the exit duct at the transition from the swirl chamber to the exit duct then provides uniform distribution of the liquid in the delivered hollow-cone spray.

In a refinement of the invention the angle of the wall of the exit duct in relation to the longitudinal central axis of the exit duct at the exit opening is in a range between 0° and 90°.

Surprisingly, it has been established that the angle of the wall of the exit duct at the exit opening may vary in a very large range, specifically between 0° and 90° in relation to the longitudinal central axis of the exit duct, the spray behaviour of the spray nozzle nevertheless still remaining good. Despite the large angle at which the angle of the wall of the exit duct may lie in relation to the longitudinal central axis, good and uniform distribution of the liquid in the delivered spray cone may especially still be achieved.

In a refinement of the invention an angle of the wall of the exit duct at the exit opening, when viewed across the circumference of the exit opening, varies between 32.5° and 65° in relation to the longitudinal central axis of the exit duct.

Such dimensioning of the variation of the angle of the wall leads to an oval spray jet having very uniform liquid distribution within the spray jet being configured. If the angle between mutually opposite points of the wall of the exit duct at the exit opening is measured, the angle of the wall varies between 75° and 130°.

In a refinement of the invention the exit opening has an oval or elliptic shape.

In this way an individual spray cone may be imparted an oval or elliptic cross-sectional shape. On account of the design of the spray nozzle according to the invention, this is possible with good liquid distribution within the spray cone.

In a refinement of the invention two swirl chambers and two exit openings are provided, wherein the exit openings are disposed such that spray jets exit through the two exit openings on the same side of the housing.

In a refinement of the invention two swirl chambers and two exit openings are provided, wherein the exit openings are disposed such that spray jets exit through the two exit openings on opposite sides of the housing.

In a refinement of the invention the nozzle housing is cast or injection-moulded and is subsequently fired or sintered.

In this way, the variable angles of the wall of the exit duct and the shape of the exit opening that deviates from the circular shape may be implemented in a highly precise and simultaneously economical manner.

The underlying issue of the invention is also solved by a method having the features of claim 9.

BRIEF DESCRIPTION OF THE DRAWINGS

Further features and advantages of the invention are derived from the claims and from the following description of a preferred embodiment of the invention, in conjunction with the drawings.

In the drawings:

FIG. 6 shows a plan view onto an arrangement having a conventional spray nozzle;

FIG. 7 shows a side view of the arrangement of FIG. 6;

FIG. 8 shows a plan view onto an arrangement having a spray nozzle according to the invention, according to a further embodiment;

FIG. 9 shows the arrangement of FIG. 8 in a side view;

FIG. 10 shows a plan view onto an arrangement having two conventional spray nozzles;

FIG. 11 shows a side view of the arrangement of FIG. 10;

FIG. 12 shows a plan view onto an arrangement having two spray nozzles according to the invention, according to a further embodiment;

FIG. 13 shows a side view of the arrangement of FIG. 12;

FIG. 14 shows a plan view onto an arrangement having two spray nozzles according to the invention, according to a further embodiment;

FIG. 15 shows a side view of the arrangement of FIG. 14;

FIG. 16 shows a plan view onto an arrangement having two conventional spray nozzles;

FIG. 17 shows a side view of the arrangement of FIG. 16;

FIG. 18 shows a plan view onto an arrangement having two conventional spray nozzles;

FIG. 19 shows a side view of the arrangement of FIG. 18;

FIG. 20 shows a plan view onto an arrangement having two spray nozzles according to the invention, according to a further embodiment;

FIG. 21 shows a side view of the arrangement of FIG. 20;

FIG. 24 shows a plan view onto an arrangement having two conventional spray nozzles;

FIG. 25 shows the arrangement of FIG. 24 in a side view;

FIG. 26 shows a plan view onto an arrangement having two conventional spray nozzles;

FIG. 27 shows a side view of the arrangement of FIG. 26;

FIG. 28 shows a plan view onto an arrangement having two spray nozzles according to the invention, according to a further embodiment;

FIG. 29 shows a side view of the arrangement of FIG. 28;

FIG. 32 shows a plan view onto an arrangement having two conventional spray nozzles;

FIG. 33 shows a side view of the arrangement of FIG. 32;

FIG. 34 shows a plan view onto an arrangement having two conventional spray nozzles;

FIG. 35 shows a side view of the arrangement of FIG. 34;

FIG. 36 shows a plan view onto an arrangement having two spray nozzles according to the invention, according to a further embodiment;

FIG. 37 shows a side view of the arrangement of FIG. 36;

DETAILED DESCRIPTION

Figure 1:
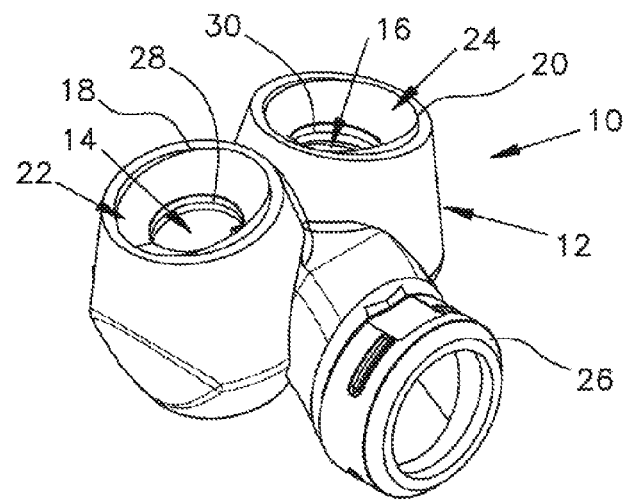
FIG. 1 shows a spray nozzle according to the invention in a view obliquely from above.
Figure 2:
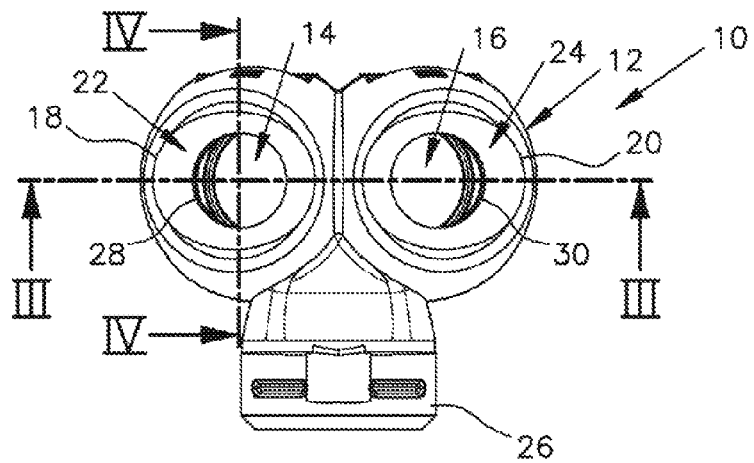
FIG. 2 shows the spray nozzle of FIG. 1 from below.

FIGS. 1 and 2 show a spray nozzle 10 according to the invention, which has a nozzle housing 12 having two swirl chambers 14, 16, and two exit openings 18, 20. In FIG. 1 the observer sees into the two exit ducts 22, 24, which then each transition into one of the swirl chambers 14, 16, respectively. The two swirl chambers 14, 16 are connected to a common connector 26. Liquid to be sprayed is supplied via the connector 26, reaches the interior of the two swirl chambers 14, 16, and is supplied to each of the swirl chambers 14, 16 in a tangential manner, from there through in each case one constriction 28, 30 reaches the respective exit duct 22, 24, and in the form of a respective hollow-cone spray then departs from the housing 12.

It can be seen already by means of the illustration of FIG. 1 that the shape of the two exit openings 18, 20 in each case deviates from a circular shape. The exit openings 18, 20 each have an elliptic shape, wherein it has to be considered that the longitudinal central axes of the two exit ducts 22, 24 that end at the exit openings 18, 20 are not disposed so as to be perpendicular to the drawing plane of FIG. 1. Rather, the longitudinal central axes of the exit ducts 22, 24 are disposed so as to diverge. On account thereof, the two spray jets generated are mutually diverging. A respective configuration of a double-swirl spray nozzle is known from European Patent Document EP 1 491 260 B1 to which reference is made in this context.

Despite the illustration of FIG. 1 being slightly distorted due to the oblique arrangement, it may also be derived from this figure that a cross section of the exit ducts 22, 24 at a point 28 or 30, respectively, that is to say in each case at the transition from the swirl chambers 14, 16 to the exit duct 22, 24, respectively, is circular. On account of the circular cross section at the transition from the respective swirl chamber 14, 16 to the exit ducts 22, 24, uniform distribution of the liquid within the delivered spray jet is achieved.

Now, by virtue of the exit openings 20 deviating from the circular shape, a cross-sectional shape which in each case deviates from the circular shape may be imparted to both delivered spray cones. In the nozzle illustrated in FIG. 1 a hollow-cone spray having an elliptic cross section exits from each of the exit openings 18, 20. An approximately oval spray cone (cf. FIG. 8) results from superimposing these two elliptic spray cones.

Figures 3, 4:
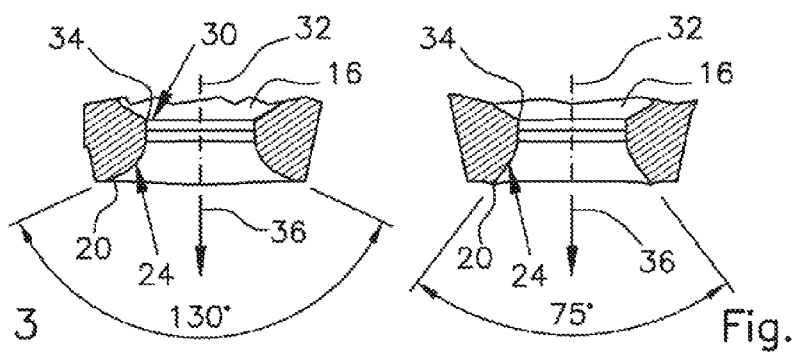
FIG. 3 shows in portions a sectional view onto the sectional plane III-III in FIG. 1.
FIG. 4 shows in portions a sectional view onto the sectional plane IV-IV in FIG. 1.

The illustration of FIG. 3 shows in portions a schematic sectional view onto the sectional plane III-III of FIG. 2. It is the intention of FIG. 3 to clarify the shape of the exit openings 18, 20 and of the exit ducts 22, 24 in the sectional plane III-III. For this reason, only the exit opening 20 and the exit duct 24 were illustrated in a sectional manner in FIG. 3; the exit opening 18 and the exit duct 22 are however identically configured. The same applies to the illustration of FIG. 4. Double spray nozzles or multiple spray nozzles having exit ducts configured in various manners are also possible in the context of the invention. A longitudinal central axis 32 of the exit duct 24 of the spray nozzle 10 is indicated in the illustration of FIG. 3. A portion of the swirl chamber 16 can still be identified at the upper end of the illustration of FIG. 3. The swirl chamber 16 ends at a slightly rounded edge 34, and the exit duct 24 begins there. As can be seen, a wall of the exit duct 24 is disposed so as to be substantially parallel with the longitudinal central axis 32 at the beginning of the exit duct 24, that is to say directly after the rounded edge 34. In fact, the wall of the exit duct 24 in this region in relation to the longitudinal central axis 32 has an angle of approx. 3° such that the exit duct 24 opens in the flow direction starting from the beginning thereof. On account thereof, a draft angle which is advantageous in the manufacture of the spray nozzle is formed. In the further profile of the exit duct 24, that is to say in the flow direction which is indicated by means of an arrow 36, an angle between the longitudinal central axis 32 and a wall of the exit duct 24 steadily increases until reaching a value of 65° and then continues at this constant angle up to the exit opening 20. On account thereof, a linear delimitation having an opening angle of 130° is disposed upstream of the exit opening 20 in the sectional plane III-III, as is illustrated in FIG. 3. Proceeding from a value of approx. 0° in relation to the longitudinal central axis, in the shown embodiment of 3°, that is to say from an arrangement in which the longitudinal central axis and the wall of the exit duct 24 are substantially parallel at the beginning of the exit duct, the angle of the wall of the exit duct 24 thus either steadily increases or is constant in portions.

A spray disintegrating into individual droplets and departing in the flow direction 36 will widen when passing through the exit duct 24 as soon as said spray has passed through the constriction 30 which is formed substantially by the encircling edge 34, to the extent that this is permitted by the wall of the exit duct 24. In the sectional plane III-III the spray cone will thus depart from the exit opening 20 having a spray angle of somewhat less than 130°.

The illustration of FIG. 4 shows in portions a schematic sectional view onto the sectional plane IV-IV in FIG. 2. The exit duct 24 at the beginning thereof, that is to say at the transition from the swirl chamber 16 to the rounded edge 34, firstly has a wall which is disposed so as to be substantially parallel with the longitudinal central axis 32 and in fact assumes an angle of 3° in relation to the longitudinal central axis 32. In the flow direction, which is indicated by the arrow 36, the angle of the wall of the exit duct 24 in relation to the longitudinal central axis 32 then steadily increases until reaching a value of 32.5°. The wall of the exit duct 24 then runs at this constant angle up to the exit opening 20. The region directly upstream of the exit opening 20 in the sectional view of the plane IV-IV thus runs in a linear manner. On account thereof, a linear delimitation having an opening angle of 75° is disposed upstream of the exit opening 20 in the sectional plane IV-IV. However, it should be remembered that the angle of the wall of the exit duct 24 varies along the circumference of the exit opening 20 and in the section plane III-III of FIG. 2, cf. FIG. 3, assumes an angle of 65° in relation to the longitudinal central axis 32. The region directly upstream of the exit opening 20 is thus not circular-conically shaped but has an irregular shape which is determined in that the angle of the wall of the exit duct 24 across half of the length of the circumference of the exit opening 20 varies from a value of 32.5° in relation to the longitudinal central axis to a value of 65° in relation to the longitudinal central axis and then back to the former value.

A spray of droplets exiting from the exit duct 24 will widen as far as the exit opening 20 as soon as said spray has passed through the constriction formed by the edge 34, and to the extent that this is permitted by the wall of the exit duct 24, such that said spray will exit at the exit opening in the plane IV-IV having a spray angle of somewhat less than 75°.

As a result, a spray cone exiting the exit duct 24 thus has a geometry having a non-round and in the illustrated embodiment elliptic cross section. The spray angle in the sectional plane is somewhat less than 130°, cf. FIGS. 2 and 3. The spray angle in the sectional plane IV-IV is somewhat less than 75°, cf. FIGS. 2 and 4.

The significant advantage of the nozzle according to the invention here is that such a cross section of an exiting spray cone, which generally deviates from a circular shape, is achieved only by way of the design of the wall and especially of the angle of the wall of the exit duct 24 in relation to the longitudinal central axis 32. By contrast, the construction of the swirl chamber 16 and of the housing of the nozzle does not have to be modified. The exit duct 24 may be adapted according to the required type of application and to the desired cross-sectional shape of the exiting spray cone. In order for the spray cone having a non-round cross section or one deviating from a circular shape, respectively, to be produced, a swirl is generated in the swirl chamber 14, 16, in order to generate centrifugal forces which act on the liquid flowing through and in order to thus set the latter in rotation. By means of the constriction 28, 30 which is formed substantially by the encircling edge 34 and lies between the swirl chamber 14, 16 and the exit duct 22, 24, the volumetric flow through the nozzle is throttled and set. The tapering which is formed by the edge 34 and the subsequent beginning of the exit duct 22, 24 here is configured such that the liquid flowing therethrough is uniformly distributed on the circumference of this constriction. Here, the swirl generated in the swirl chamber and the liquid thus rotating in the swirl chamber play an important part. The non-round spray cone is then shaped in the exit duct 22, 24 by the wall of the exit duct, which is constructed in a non-rotationally symmetrical manner. On account of dissimilar gradients or of dissimilar angles, respectively, the departure angle of the droplets up to the exit opening 18, 20 is individually predefined. The departure angle of the droplets is predefined depending on the wall portion in which the droplets are located and on which angle this wall portion assumes in relation to the central axis, and as a result a spray cone having a non-round cross section is shaped on account thereof.

This enables a very flexible manufacturing method in the case of nozzles made from ceramics or sintered materials. The nozzle housing 12 having the two swirl chambers and the connector 26 may always be manufactured by means of the same moulds. Only the nozzle mouths, that is to say the exit ducts 22, 24 are modified according to the desired type of application. Modified moulds may then be used to this end. A ceramic compound is thus shaped as desired and subsequently fired. Nozzles having various cross-sectional shapes of the delivered spray jets may be manufactured in a comparatively simple and cost-effective manner in this way. Accordingly, one may proceed in an analogous manner in the case of nozzles which are manufactured from sintered materials. For example, a metal powder is mixed here with a plastics binder, injected into a mould, and subsequently sintered so as to then obtain a nozzle which is composed of a metallic sintered material. However, the spray nozzle according to the invention may also be cast from plastics or metal, for example, be manufactured in a layered construction or else made mechanically by means of subtractive machining methods.

A significant advantage of the nozzle according to the invention is that uniform distribution of the liquid in the delivered spray jets may be guaranteed by maintaining the shape of the swirl chambers and also the circular shape of the exit duct at the beginning of the exit ducts 22, 24. Only the cross-sectional shape of the spray jets is modified by the design of the exit ducts and the shape of the exit openings 18, 20.

Figure 5:
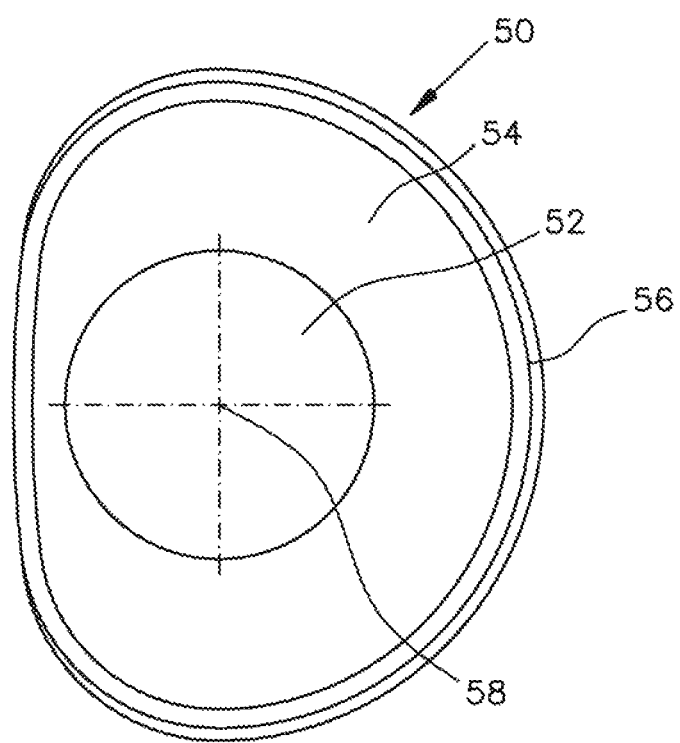
FIG. 5 shows a plan view onto a spray nozzle according to the invention, according to a further embodiment of the invention.
Figure 22:
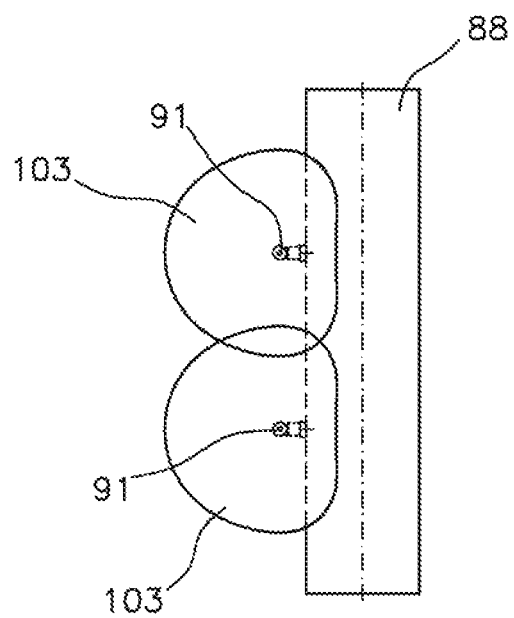
FIG. 22 shows a plan view onto an arrangement having two spray nozzles according to the invention, according to a further embodiment.
Figure 23:
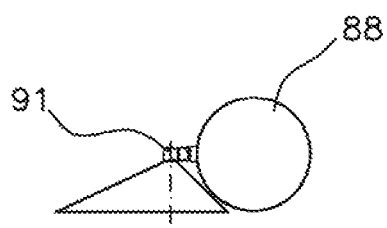
FIG. 23 shows a side view of the arrangement of FIG. 22.

The illustration of FIG. 5 in a plan view shows a spray nozzle 50 according to the invention, according to a further embodiment of the invention. The spray nozzle 50 is also configured as a swirl-spray nozzle and has a housing having a swirl chamber 52 and an exit duct 54 which extends from a transition from the swirl chamber 52 to the exit duct 54 up to an exit opening 56. In FIG. 5, the observer sees, counter to the spray direction of the spray nozzle 50, into the exit duct 54 and into the swirl chamber 52.

It can be seen that the exit duct at the transition from the swirl chamber 52 to the exit duct 54 has a circular cross section. In the further profile of the exit duct 54 towards the exit opening 56, the cross section of the exit duct 54 changes, the latter also widening in this direction. The exit duct 54 in the direction towards the exit opening 56 assumes a cross-sectional shape which approximately corresponds to a flattened circle on one side. A spray cone which is delivered by the spray nozzle 50 during operation is also shaped by this shaping of the exit duct 54. On a planar area which lies perpendicular to a central axis 58 of the swirl chamber 52, the spray nozzle 50 would generate a spray impingement having an area which is approximately the shape of the exit opening 56 or larger. Such a spray impingement is advantageous, for example, when the spray nozzle 50 is to be disposed close to the wall of a processing space and when it is undesirable for the wall of the processing space to be conjointly sprayed.

The illustration of FIG. 6 shows an arrangement having a conventional double-swirl spray nozzle 60 which has two exit openings which are disposed beside one another and which in each case deliver a spray cone which has a circular cross section. The spray cones here are not mutually parallel but oriented away from one another such that the central axes of the two swirl chambers of the spray nozzle 60 diverge as the spacing from the exit openings increases when viewed in the spray direction.

On account thereof a spray geometry 62 which has a shape which narrows in the centre results when the two spray cones are superimposed. However, it is particularly disadvantageous that a proportion 64 of a spray geometry that is drawn with shaded lines in FIG. 6 does not in fact become effective. Rather, this proportion 64 of the spray geometry would impact a wall 66 of a processing space.

This can also be seen in the side view of FIG. 7. The spray which in the side view of FIG. 7 itself per se is conical impacts the wall 66 of the processing space such that the hatched proportion 64 of the spray geometry 62 in fact impacts the wall 66 and can no longer be utilized.

The illustration of FIG. 8 schematically shows the spray nozzle 10 according to the invention of FIGS. 1 to 4, in the installed state, especially in a gas scrubber 40 which is schematically illustrated in portions and of which only a portion of the wall 66 thereof is illustrated. The observer, in FIG. 4, sees inside the circular-cylindrical gas scrubber from above. The spray nozzle 10 is disposed in the peripheral region of the gas scrubber 40, fastenings not being illustrated. The spray nozzle 10 delivers two spray cones, only the resulting superimposed spray geometry 72 being illustrated. As has been discussed, one spray cone having an approximately elliptic shape exits each of the exit openings 18, 20. When superimposed, a spray geometry 72 having an oval cross section then results. It can be readily seen that such an oval cross-sectional shape of the spray jet 72 is desired on account of the arrangement of the spray nozzle 10 in the peripheral region of the gas scrubber 40. This is because it can be ensured on account thereof that in comparison with a spray cone having a circular cross section only very little of the sprayed liquid reaches the wall of the gas scrubber 40 at the defined spacing.

The cross-sectional shape of a delivered spray geometry, regardless of whether this is the cross-sectional shape of an individual delivered spray cone or the cross-sectional shape of two or a plurality of superimposed spray cones, may be set within wide limits by way of the spray nozzle according to the invention. Depending on the given type of application and on the cross-sectional shape desired in the special type of application, an optimal spraying result may be achieved on account of the above.

The embodiment illustrated shows a double-swirl spray nozzle having two exit openings which deliver spray jets in the same direction. It is obvious that the invention may also be applied in other types of spray nozzles, especially in swirl spray nozzles which have only one exit opening, or in double-swirl spray nozzles which have two exit openings from which spray jets exit in opposite directions. The invention may also be applied in multiple spray nozzles which have more than two exit openings.

In relation to the wall 66 of the processing space, the double-swirl spray nozzle 10 according to the invention, according to FIG. 8, is disposed at the same point as the spray nozzle 60 in FIG. 6. However, it can be seen in FIG. 8 that a spray geometry 72 which has an oval cross-sectional shape may be generated by the double-swirl spray nozzle 10 according to the invention. This is achieved by superimposing the two spray cones which are generated by the double-swirl spray nozzle 10. It can be seen already in FIG. 8 that only a very small proportion 74 of the spray geometry 72 generated impacts the wall 66 and is thus lost.

This can also be seen in the side view of FIG. 9. The spray geometry 72 having an oval cross-sectional shape has a significantly lower loss on the wall, since the spray geometry 72 impacts the wall 66 only by way of the extreme periphery of the former. In comparison to the arrangement having the conventional double-swirl spray nozzle 60 of FIGS. 6 and 7, an obviously reduced loss on the wall may be achieved on account thereof, and coverage across a large area of the processing space may nevertheless be achieved with the double-swirl spray nozzle 10 according to the invention.

The double-swirl spray nozzle 10 according to the invention thus enables the shaping of the delivered spray geometry 72 and, on account thereof, the use of large spray angles without losing any unused sprayed medium on the wall 66.

The illustration of FIG. 10 shows a plan view onto an arrangement having two conventional double-swirl spray nozzles 60. The double-swirl spray nozzles 60 each generate two spray cones, each having a circular cross-sectional shape. When superimposed, a spray geometry 76 which in the plan view has approximately the shape of a balloon which has been narrowed twice results. It can be seen that by superimposing the four spray cones delivered by the double-swirl spray nozzles 60 in conjunction with a large spray angle, coverage across a large area may be achieved by the spray geometry 76. However, a significant proportion 78 of the spray geometry 76 impacts the wall 66 of the processing space, this being indicated by the hatched proportion 78 of the spray geometry 76.

The side view of FIG. 11 clearly shows the delivered spray geometry 76 which in part impacts the wall 66 such that the proportion 78 of the spray geometry 76 is lost, and the sprayed medium of this proportion 78 can no longer be utilized in the processing space, for example for gas scrubbing.

The illustration of FIG. 12 shows an arrangement having two double-swirl spray nozzles 80 according to the invention, according to a further embodiment of the invention. The respective exit duct and the respective exit opening of the double-swirl spray nozzles 80 according to the invention are shaped such that, when superimposed, a spray geometry 82 which in the plan view of FIG. 12 has the shape of a rectangle having rounded corners results. It can be clearly seen that coverage across a large area may be achieved by the spray geometry 82, as is the case in the arrangement of FIG. 10, but that the proportions 84 which are hatched in FIG. 12 are obviously smaller than the proportions 78 of the arrangement of FIG. 10. The shaping of the spray cones to form a non-round cross-sectional shape in the double-swirl spray nozzles 80 according to the invention leads to an obvious reduction of the losses on the wall, this being clearly identifiable on account of the hatched proportions 84 of the spray geometry 82 being obviously smaller than the proportions 78 in the case of the arrangement of FIG. 10. Using the arrangement having the two double-swirl spray nozzles 80 according to the invention, the sprayed medium may thus be utilized in a substantially better manner.

The side view of FIG. 13 shows the arrangement of FIG. 12 in a side view. It can be seen that only a very small proportion of the spray geometry 82 impacts the wall 66 of the processing space.

The illustration of FIG. 14 shows an arrangement having two double-spray nozzles 81 according to the invention, according to a further embodiment of the invention. The respective exit duct and the respective exit opening of the double-swirl spray nozzles 81 according to the invention are shaped such that, when superimposed, a spray geometry 83 results. The spray geometry 83 is non-symmetrical to the extent that the former, proceeding from the spray nozzles 81, extends farther to the interior space of the circular wall 66 than to the wall 66.

The view of FIG. 15 shows the arrangement of FIG. 14 in a side view. It can be seen that on account of the non-symmetrical spray geometry 83, only a very small proportion of the generated spray of droplets impacts the wall 66, and that a large area of the processing space in the radial direction from the wall 66 to the inside, that is to say towards the right in FIG. 15, may be covered.

The illustration of FIG. 16 shows an arrangement having two conventional swirl spray nozzles 86 in a plan view. The two swirl spray nozzles 86 each generate one spray cone having a circular cross-sectional shape. The swirl spray nozzles 86 are supplied with a medium to be sprayed from a common collective pipeline 88. The swirl spray nozzles 86 are chosen such that they have a large spray angle and, on account thereof, are able to impinge as large a proportion of a processing space as possible with the delivered spray cone.

However, this results in a proportion 94 of the respectively delivered spray cone 92, which is hatched in FIG. 16, impacting the collective pipeline 88. On account thereof, sprayed medium is lost which may not be used for gas scrubbing, for example; there is moreover the risk of the delivered spray cones 92 in the long term damaging the collective pipeline 88.

FIG. 17 shows a side view of the arrangement of FIG. 16. It can be clearly seen that the proportions 94 of the delivered spray cones 92 impact the collective pipeline 88.

The illustration of FIG. 18 shows a plan view onto a further arrangement having two conventional swirl spray nozzles 96. The spray angle of the two swirl spray nozzles 96 has now been chosen to be smaller than in the case of the swirl spray nozzles 86 of FIGS. 16 and 17. On account thereof, it is indeed avoided that the delivered spray cone 98 impacts the collective pipeline 88, cf. also the side view of FIG. 19. However, at the same time it has to be taken into account that the impingement by the delivered spray cones 98 is substantially smaller than in the case of the swirl spray nozzles 86 of FIGS. 16 and 17.

FIG. 20 shows a plan view onto an arrangement having two swirl spray nozzles 90 according to the invention. The two swirl spray nozzles 90 each deliver a spray cone 102 which have an oval-shaped cross section. It can be seen by means of FIG. 20 that an impingement across a large area of the processing space may be achieved by superimposing the two spray cones 102. It can be seen from the side view of FIG. 21 that it is at the same time avoided that the delivered spray cones 102 impact the collective pipeline 88.

The illustration of FIG. 22 shows a plan view onto an arrangement having two swirl spray nozzles 91 according to the invention. The two swirl spray nozzles 91 each deliver a spray cone 103 which has an irregularly-shaped cross section. The spray cones 103 extend further in the direction away from the collective pipeline 88 into the processing space than in the direction towards the collective pipeline 88. On account thereof, an impingement of the processing space across a large area may be achieved, on the one hand, and it is avoided, on the other hand, that the delivered spray cones 103 impact the collective pipeline 88, cf. the side view in FIG. 23.

The illustration of FIG. 24 shows an arrangement of two conventional double-swirl spray nozzles 104 wherein each of the double-swirl spray nozzles 104 delivers an upwardly directed spray cone 106 and a downwardly directed spray cone 108, cf. also the side view of FIG. 25.

The two double-swirl spray nozzles 104 are fed from the common collective pipeline 88. Large spray angles are chosen in order to achieve impingement across a large area by the spray cones 106, 108. However, it can be seen in the side view of FIG. 25 that the upwardly exiting spray cone 106 in part impacts the collective pipeline 88. On account thereof, medium to be sprayed is lost, on the one hand, and there is the risk of damaging the collective pipeline 88, on the other hand.

The illustration of FIG. 26 shows a plan view onto an arrangement having two conventional double-swirl spray nozzles 110. The double-swirl spray nozzles 110 each deliver a spray cone 112 having a small spray angle upwardly, and a spray cone 114 having a large spray angle downwardly, cf. also the side view of FIG. 27. On account thereof, spraying of the collective pipeline 88 by the upwardly delivered spray cones 112 may indeed be prevented, cf. the side view of FIG. 27. However, the impingement of the processing space by the upwardly delivered spray cones 112 is comparatively small and unsatisfactory.

The illustration of FIG. 28 shows an arrangement having two double-swirl spray nozzles 100 according to the invention. The double-swirl spray nozzles 100 each deliver a spray cone 114 having a circular cross section downwardly and each a upwardly, spray cone 116 having an oval cross section cf. also the side view of FIG. 29. On account thereof, by way of the superimposition of the two spray cones 116 which have an oval-shaped cross section, an impingement across a large area of the processing space is also achieved in the upward spray direction; at the same time, however, it can also be ensured that the collective pipeline 88 is not sprayed by the upwardly delivered spray cones 116.

Figure 30:
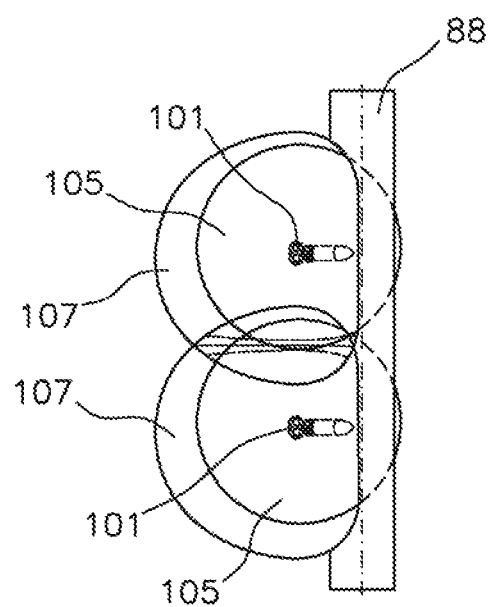
FIG. 30 shows a plan view onto an arrangement having two spray nozzles according to the invention, according to a further embodiment.
Figure 31:
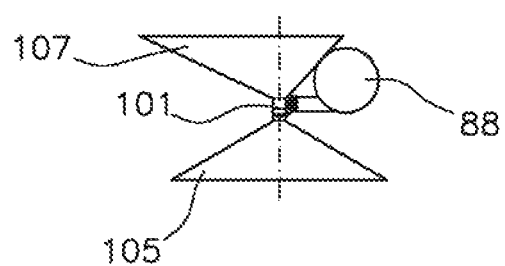
FIG. 31 shows a side view of the arrangement of FIG. 30.
Figure 38:
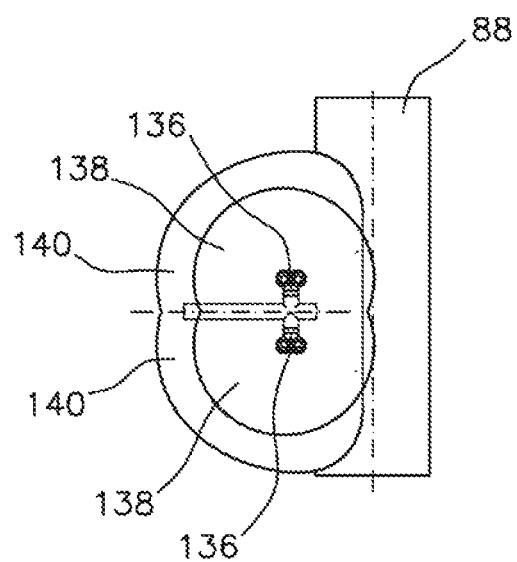
FIG. 38 shows a plan view onto an arrangement having two spray nozzles according to the invention, according to a further embodiment.
Figure 39:
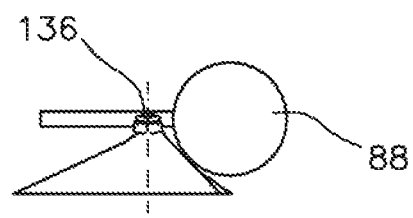
FIG. 39 shows a side view of the arrangement of FIG. 38.

The illustration of FIG. 30 shows an arrangement having two double-swirl spray cones 101 according to the invention. Each of the double-swirl spray cones 101 delivers a spray cone 105 having a circular cross section downwardly and a spray cone 107 having an irregularly-shaped cross section upwardly. As can be seen from the side view of FIG. 31, it is achieved by the irregularly-shaped spray cone 107 that the processing space is impinged across a large area, but that the collective pipeline 88 is not hit by the upwardly delivered spray jet 107. The upwardly directed exit openings of the double-swirl spray nozzles 101 to this end are configured such that the spray jet 107 extends away from the collective pipeline 88 further into the processing space than in the direction towards the collective pipeline 88. As has been discussed, this is achieved in that the wall of the exit opening on that side that faces the collective pipeline 88 has a steeper angle than on that side that faces away from the collective pipeline 88.

The illustration of FIG. 32 shows an arrangement having two conventional double-swirl spray nozzles 118. Each of the double-swirl spray nozzles 118 delivers two spray cones each having a circular cross section, wherein the central axes of the swirl chambers of each double-swirl spray nozzle 118, when viewed in the spray direction, diverge slightly, as can be seen in the side view of FIG. 33. The delivered spray geometry 120 indeed ensures coverage across a large area, but in portions sprays the collective pipeline 88, cf. also FIG. 33.

FIG. 34 shows a further arrangement having two conventional double-swirl spray nozzles 122, wherein a smaller spray angle has been chosen in comparison to the double-swirl spray nozzles 118 of FIGS. 32 and 33. As can be derived from FIG. 35, spraying of the collective pipeline 88 may now be avoided; however, only an obviously smaller area of the processing space is impinged by the sprayed medium, as can be readily established by means of a comparison between FIGS. 32 and 34, or 33 and 35, respectively.

The illustration of FIG. 36 shows a plan view onto an arrangement having two double-swirl spray nozzles 130 according to the invention. Each of the double-swirl spray nozzles 130 delivers two spray cones, wherein the first delivered spray cone 132 has a circular cross section, and the second delivered spray cone 134 has an oval cross section.

The two swirl chambers of the double-swirl spray nozzles 130 are disposed at an angle to one another such that a spacing between the central axes of the two swirl chambers is enlarged when viewed in the spray direction.

The total spray jet resulting from the superimposition of the spray jets 132, 134 now has an irregular shape. It may, however, be achieved by superimposition that impingement across a large area of the processing space is achieved and at the same time that spraying of the collective pipeline 88 is avoided, cf. also the side view of FIG. 37. It can be seen in the illustration of FIG. 37 that the spray cones 132, 134 are mutually penetrating and on account thereof the resulting superimposed spray geometry excludes the region of the collective pipeline 88.

The illustration of FIG. 38 shows a further arrangement having two double-swirl spray nozzles 136 according to the invention. Each of the double-swirl spray nozzles delivers two spray cones in the approximately the same downward direction, wherein a first spray cone 138 has a circular cross section, and a second spray cone 140 has an irregularly-shaped cross section. The irregularly-shaped cross section here is configured such that the spray cone 140 extends away from the double-swirl spray nozzle 136 further into the processing space, that is to say away from the collective pipeline, than in the direction towards the collective pipeline 88. The spray geometry illustrated in the side view in FIG. 39 results from the superimposition of the two spray jets 138 and the two spray jets 140. It can be seen that the processing space is covered across a large area but that the collective pipeline 88 is not impinged.

A significant aspect of the invention thus lies in generating a desired shape of spray impingement by superimposing at least two spray cones, wherein at least one of the two spray cones has a non-circular cross section.

The invention claimed is:

1. A spray nozzle for spraying a single fluid having a nozzle housing, at least one swirl chamber which is disposed in the nozzle housing, only a single liquid inlet for fluid to be sprayed and for supplying the fluid to be sprayed to the at least one swirl chamber in a tangential manner, and at least one exit opening, wherein the exit opening is disposed at an end of an exit duct which emanates from the at least one swirl chamber and widens in a direction towards the exit opening, wherein a constriction is disposed at a transition from the at least one swirl chamber to the exit duct, and wherein an angle of a wall of the exit duct, starting from the constriction, steadily increases in the direction towards the exit opening or in portions remains identical, wherein a shape of the exit opening deviates from a circular shape, and in that the angle of the wall of the exit duct at the exit opening, when viewed in a circumferential direction of the exit opening, is not constant.

2. The spray nozzle according to claim 1, wherein the exit duct at the transition from the at least one swirl chamber to the exit duct has a circular cross section.

3. The spray nozzle according to claim 1, wherein the angle of the wall of the exit duct in relation to a longitudinal central axis of the exit duct at the exit opening is in a range between 0 degrees and 90 degrees.

4. The spray nozzle according to claim 1, wherein the angle of the wall of the exit duct at the exit opening, when viewed in the circumferential direction of the exit opening, varies between 25° and 70°.

5. The spray nozzle according to claim 1, wherein the exit opening has an oval or elliptic shape.

6. A spray nozzle having a nozzle housing, at least one swirl chamber which is disposed in the nozzle housing, and at least one exit opening, wherein the exit opening is disposed at an end of an exit duct which emanates from the at least one swirl chamber and widens in a direction towards the exit opening, wherein a constriction is disposed at a transition from the at least one swirl chamber to the exit duct, and wherein an angle of a wall of the exit duct, starting from the constriction, steadily increases in the direction towards the exit opening or in portions remains identical, wherein a shape of the exit opening deviates from a circular shape, and in that the angle of the wall of the exit duct at the exit opening, when viewed in a circumferential direction of the exit opening, is not constant, wherein two swirl chambers and two exit openings are provided, wherein the two exit openings are disposed such that spray jets exit through the two exit openings on a same side of the nozzle housing.

7. A spray nozzle having a nozzle housing, at least one swirl chamber which is disposed in the nozzle housing, and at least one exit opening, wherein the exit opening is disposed at an end of an exit duct which emanates from the at least one swirl chamber and widens in a direction towards the exit opening, wherein a constriction is disposed at a transition from the at least one swirl chamber to the exit duct, and wherein an angle of a wall of the exit duct, starting from the constriction, steadily increases in the direction towards the exit opening or in portions remains identical, wherein a shape of the exit opening deviates from a circular shape, and in that the angle of the wall of the exit duct at the exit opening, when viewed in a circumferential direction of the exit opening, is not constant, wherein two swirl chambers and two exit openings are provided, wherein the two exit openings are disposed such that spray jets exit through the two exit openings on opposite sides of the nozzle housing.

8. The spray nozzle according to claim 1, wherein the nozzle housing is cast or injection-moulded and is subsequently fired or sintered.

9. A method for producing a spray cone by spraying a single liquid, having a non-round cross section with a spray nozzle, the method comprising:
   introducing liquid to be sprayed into a swirl chamber in a tangential manner by a single liquid inlet;
   producing a swirl in order to produce centrifugal forces acting on the liquid streaming through the swirl chamber;
   choking and adjusting an amount of the liquid streaming from the swirl chamber by a constriction between the swirl chamber and an exit duct which ends at an exit opening of the spray nozzle;
   wherein by the constriction the liquid to be sprayed is uniformly distributed across a circumference of the constriction; and
   shaping the spray cone having a non-round cross section in the exit duct by predefining a departure angle of droplets in the exit duct by a wall of the exit duct, which spray cone, proceeding from the constriction up to the exit opening, when viewed across a circumference of said spray cone, at least in portions widens at dissimilar angles to a central axis of the exit duct up to the exit opening.

10. A method for producing a spray cone having a non-round cross section with a spray nozzle, the method comprising:
   introducing liquid to be sprayed into a swirl chamber in a tangential manner by a single liquid inlet;
   producing a swirl in order to produce centrifugal forces acting on the liquid streaming through the swirl chamber;
   choking and adjusting an amount of the liquid streaming from the swirl chamber by a constriction between the swirl chamber and an exit duct which ends at an exit opening of the spray nozzle;
   wherein by the constriction the liquid to be sprayed is uniformly distributed across a circumference of the constriction; and
   shaping the spray cone having a non-round cross section in the exit duct by predefining a departure angle of droplets in the exit duct by a wall of the exit duct, which spray cone, proceeding from the constriction up to the exit opening, when viewed across a circumference of said spray cone, at least in portions widens at dissimilar angles to a central axis of the exit duct up to the exit opening; and
   superimposing at least two spray cones, wherein at least one of the spray cones, when viewed in a plane which is parallel with the exit opening, has a cross-sectional shape which deviates from a circular shape.

11. The spray nozzle according to claim 4, wherein the angle of the wall of the exit duct at the exit opening, when viewed in the circumferential direction of the exit opening, varies between 32.5° and 65°.

12. The spray nozzle according to claim 6, wherein the exit duct at the transition from the two swirl chambers to the exit duct has a circular cross section.

13. The spray nozzle according to claim 6, wherein the angle of the wall of the exit duct at each of the two exit openings, when viewed in the circumferential direction of the two exit openings, varies between 25° and 70°.

14. The spray nozzle according to claim 6, wherein each of the two exit openings has an oval or elliptic shape.

15. The spray nozzle according to claim 7, wherein the exit duct at the transition from the two swirl chambers to the exit duct has a circular cross section.

16. The spray nozzle according to claim 7, wherein the angle of the wall of the exit duct in relation to a longitudinal central axis of the exit duct at each of the two exit openings is in a range between 0 degrees and 90 degrees.

17. The spray nozzle according to claim 7, wherein the angle of the wall of the exit duct at each of the two exit openings, when viewed in the circumferential direction of the two exit openings, varies between 25° and 70°.

18. The spray nozzle according to claim 7, wherein each of the two exit openings has an oval or elliptic shape.

19. The spray nozzle according to claim 1, wherein the spray nozzle is always open between the at least one swirl chamber and the exit opening to allow the exit opening to continuously spray the fluid entering the at least one swirl chamber.

20. The method according to claim 9, further including maintaining an area between the swirl chamber and the exit opening open to allow continuous spraying of the liquid entering the swirl chamber out the exit opening.

* * * * *